Jan. 13, 1953 J. A. VOORHIES ET AL 2,625,593
GLASS LEVEL INDICATOR

Filed March 10, 1948 2 SHEETS—SHEET 1

Inventors
James A. Voorhies and
John Earl Frazier

By Christy, Parmelee & Strickland
His Attorneys

Inventors
James A. Voorhies and
John Earl Frazier
By Christy, Parmelee & Strickland
His Attorneys Patented Jan. 13, 1953

2,625,593

UNITED STATES PATENT OFFICE 2,625,593

GLASS LEVEL INDICATOR

James A. Voorhies and John Earl Frazier, Washington, Pa., assignors to Frazier-Simplex, Inc., Washington, Pa., a corporation of Delaware Application March 10, 1948, Serial No. 13,984

5 Claims. (Cl. 177—311)

This invention relates to a device for indicating the level of molten glass in a melting chamber, refining chamber, forehearth, drawing tank or the like, and control mechanism responsive thereto.

The manufacture of quality glass products as now carried on requires that the molten glass in the refining chamber, forehearth, or drawing tank be maintained at a substantially constant level, within relatively narrow limits. To this end, so-called automatic batch feeders have been installed for supplying the raw materials to the melting tank of the furnace. Such feeders have heretofore been manually controlled in accordance with the judgment of the operator relying usually on visual observation for a determination of the proper level. It is notoriously difficult to determine the level of molten glass in the tank by eye, and, for that reason, batch feeders have not been fully effective for their intended purpose. Even in the absence of batch feeders, however, it is desirable for the furnace operator to know the actual level of molten glass in the refining chamber, drawing tank or forehearth. It is an object of our invention, therefore, to provide means for affording a precise indication of the level of molten glass in a tank, which is readily observable from outside the furnace. A further object is to provide automatic control means for a batch feeder responsive to the level of glass in the refining chamber. A still further object is to provide means for initiating the operation of a visual control which indicates the level of the molten glass in the tank.

Our invention makes use of a known phenomenon, viz., the generation of a minute electrostatic potential in the form of a residual charge on the surface of a mass of salt upon the fusion thereof. We are able to utilize this phenomenon because salts are the principal ingredients of glass and because the material usually employed for lining a glass furnace is an electrical insulator and therefore prevents the charge accumulating on the surface of the glass from leaking off to ground. In a preferred embodiment, we provide a feeler or exploring contact as a charge collecting means or element for engaging the surface of the glass and mounting means therefor capable of accurate adjustment toward and from said surface. Electrical means responsive to the surface charge on the molten glass connected to the contact indicates it has engaged the surface and an indicator actuated in accordance with the position of the contact reveals the actual level of the glass to the operator.

In addition to indicating contact with the glass, the electrical means may serve to control the operation of a batch feeder, or other mechanism.

A complete understanding of the invention may be obtained from the following detailed description which refers to the accompanying drawings illustrating the present preferred embodiment of our invention. In the drawings, which are partly diagrammatic:

Figure 1:
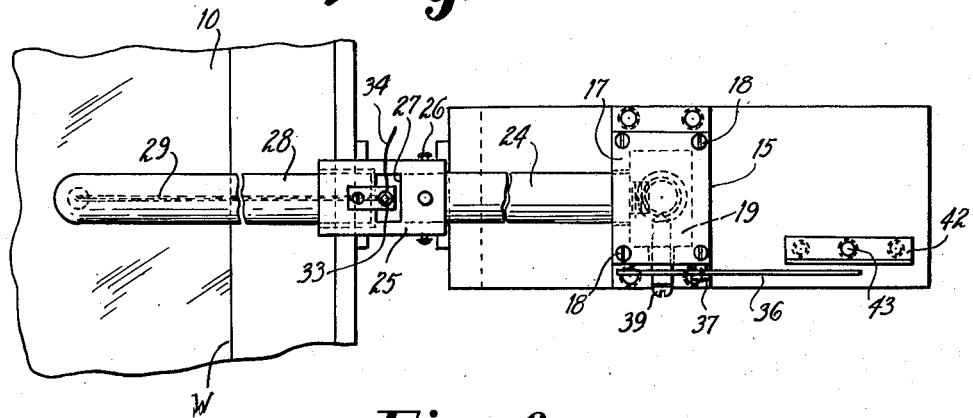
Figure 1 is a plan view of our improved indicating mechanism.
Figure 2:
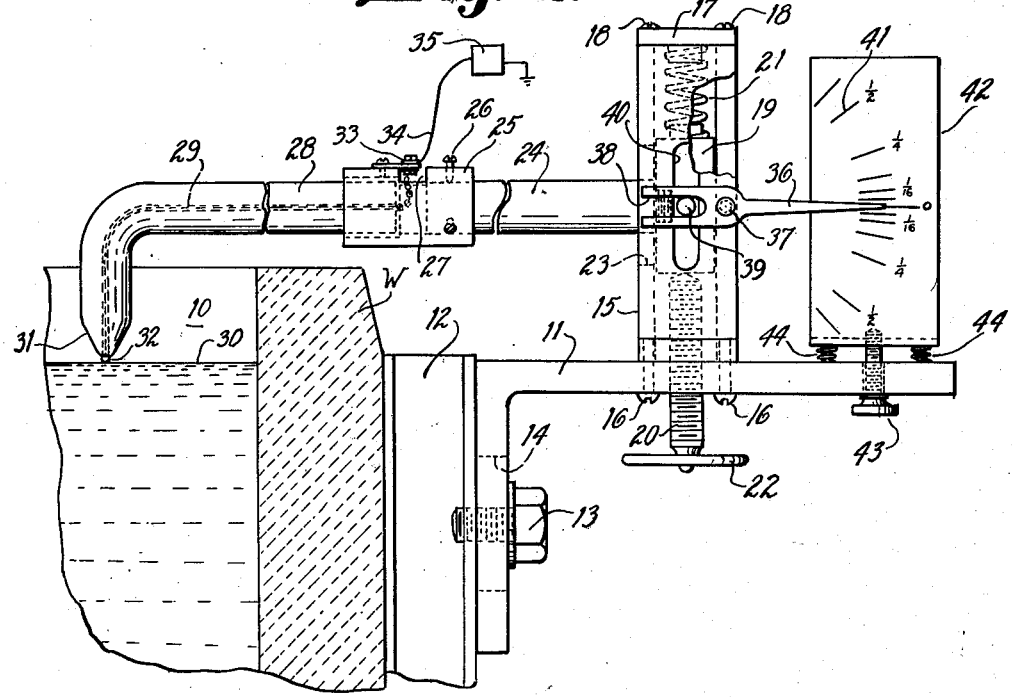
Figure 2 is a side elevation thereof showing diagrammatically its relation to the refining chamber of a glass furnace.

Referring in detail to the drawings, and for the present, to Figures 1 and 2, the refining chamber of a glass furnace is indicated at 10. An angle bracket 11 is secured to any suitable support, such as one of the buckstays 12 of the furnace binding, by one or more bolts 13. The bracket has slots 14 in its vertical portion through which the bolts extend, permitting a coarse vertical adjustment of the bracket and the parts carried thereon, which parts will be described next. A vertically elongated guide box or tube 15 is secured to the outstanding horizontal arm of the bracket 11 by screws 16 and is provided with a top plate 17 held thereon by screws 18. The box, as shown, is rectangular in horizontal section, but it is obvious that it could have any other section. The box 15 slidably receives a block or plug 19 of corresponding section fitting snugly therein. A vertical screw 20 threaded through the bracket arm coaxially with the box and block supports the latter at a predetermined level in the former. A compression spring 21 engaging the block and top plate 17 holds the block firmly seated on the screw. The screw has a hand-wheel 22 at the lower end whereby it may be turned to adjust the block in the guide box for a purpose which will shortly appear.

The wall of the box parallel to the vertical arm of the bracket 11 has a slot 23 therein. A horizontal bar 24 extends through the slot and has its end reduced and threaded into the block 19. A sleeve 25 of electrically insulating material is secured on the outer end of the rod by set-screws 26 and has a transverse slot 27 milled therethrough. A porcelain tube 28 is cemented in the sleeve and projects therefrom inwardly of the chamber 10 over a wall W thereof. A platinum wire 29 extends through the tube. The inner end of the tube is bent down at right angles or any other suitable inclination toward the surface of the molten glass indicated at 30 and the tip thereof is tapered as at 31. The bar 24 and tube 28 form an arm extending laterally from block 19 and downwardly toward the surface of the glass 30. The wire 29 terminates in a metal bead 32 which is exposed at the tip of the tube for contact with the surface of the glass, and thus constitutes a feeler or exploring contact means or element for collecting the electrostatic charge which accumulates on said surface, as aforesaid.

The wire 29 has its outer end secured to a binding post 33 mounted on sleeve 25. A conductor 34 extends therefrom to any suitable form of translating means such as that comprising an indicating device responsive to a small electrostatic charge, an electroscope 35, for example. It will be evident that, when the screw 20 is actuated to lower the bead 32 into contact with the surface of the molten glass, the charge thereon will immediately cause operation of the electro-responsive indicating device 35. In order for this indication to have significance, we mount a pointer 36 on a pivot pin 37 extending outwardly from one of the lateral faces of the box 15. The rear end of the pointer is slotted as at 38 for cooperation with a pin 39 projecting from the block 19 through a slot 40 in the side wall of the box 15 on which the pivot pin 37 is mounted. The forward end of the pointer cooperates with a scale 41 on a panel 42. The panel is adjustably mounted on the horizontal arm of bracket 11 by means of thumb bolt 43 and springs 44 to facilitate the initial or zero adjustment thereof. The coarse adjustment made possible by the slots in the bracket 11 through which the bolts 13 extend is also for this purpose. The bolt 43 obviously permits a finer adjustment so that an accurate zero setting may be obtained. When the bracket and scale have been set for the desired normal level of glass in the chamber 10, any deviation from that level will be revealed by making contact between the bead 32 and the glass 30 as explained above. When the apparatus is used solely for indicating the glass level, the block 19 is ordinarily kept high enough to raise the bead above the glass and is lowered to make contact only when it is desired to take a reading. If the glass is below normal level, the bead will have to be lowered below the position in which it is shown in order for the bead 32 to make contact, with the result that the pointer 36 will be turned counterclockwise. If the glass level is above normal when engaged by the bead, the pointer will occupy a position at some angle below horizontal, indicating the excess height. The scale 41 is suitably calibrated as shown, preferably to indicate fractions of an inch of glass level.

Figure 3:
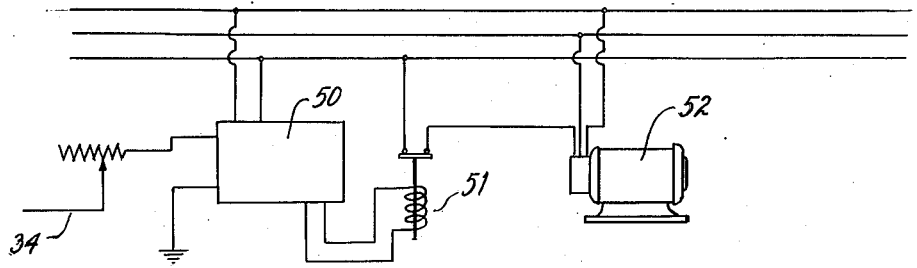
Figure 3 is a diagram of one form of control circuit adapted for use with the invention.

The invention is equally adapted for actuating other forms of translating means such as, for example, the automatic control of a batch feeder or other apparatus, a typical control system therefor being shown in Figure 3. According to this system, conductor 34 is connected to a millivolt controller 50 of known construction. This device responds to the charge received from the surface of the molten glass by bead 32, by closing a contact in the energizing circuit of a relay 51. When energized, this relay opens the circuit of a motor 52 driving the batch feeder. The relay contacts are normally closed so the motor is restarted as soon as the glass level is lowered sufficiently to break contact with the bead 32. The relay may control suitable signal lamps or the like, as well as the motor 52.

Figure 4:
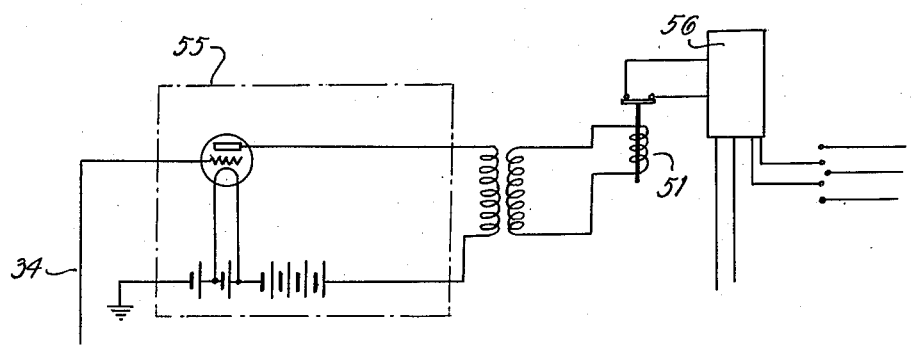
Figure 4 is a diagram of an alternate control circuit.

Figure 4 is a diagram of another control circuit which may be employed with the invention. In this case, the conductor 34 feeds the surface charge from the glass to the input of a single-stage amplifier 55. The output of the amplifier operates a relay 51 in the same manner as the controller 50. The relay 51 in this system, instead of controlling the motor of the batch feeder directly, works through a time-delay relay 56 of known construction which prevents "signal" received over the conductor 34 from being effective immediately. This is desirable because of the bead effect encountered when the invention is utilized for control purposes. Under those conditions, the block 19 is adjusted so that the bead 32 is at the desired glass level, or zero reading of the indicator, and left there. Successive rises and falls of level operate the control system as described above. As a result of repeated making and breaking of contact with the glass, a glass bead forms over the platinum bead 32 and causes a thread-like conductor of viscous glass to be formed upon the next fall of the glass level. A short space of time is required for this thread-like conductor to sever itself before a succeeding rise of glass level will be properly indicated. Otherwise, the system of Figure 4 is similar to that of Figure 3.

It will be apparent from the foregoing that the invention is a highly useful adjunct to a glass furnace, since it affords a highly accurate, quickly obtainable indication of the level of the glass in the refining chamber or the like, and is also capable of serving as an automatic control device with the aid of conventional auxiliary apparatus, to regulate the operation of a motor-driven batch feeder or other apparatus. The device is simple, direct-acting and relatively inexpensive to manufacture. It thus has a wide range of application in the glass industry.

Although we have illustrated and described but a single preferred embodiment with two alternative control systems, it will be recognized that changes in the details and arrangement disclosed may be made without departing from the spirit of the invention or the scope of the appended claims.

We claim:

1. In an apparatus for electrically determining the level of molten glass in a tank of insulating material without the use of an outside source of energy and solely by the electrostatic charge accumulating on the surface of the glass, the invention comprising a charge collecting element located in the tank for relative movement between the element and the surface of the glass, and solely electrostatic charge responsive means responsive to the collection of the charge by the element from the surface of the glass for determining the relative position of the element to the surface of the glass.

2. Apparatus as defined by claim 1 characterized by said means being an electroscope.

3. Apparatus as defined by claim 1 characterized by said means being a millivolt controller.

4. Apparatus as defined by claim 1 characterized by said means being a thermionic amplifier including a cathode, an anode and a grid, the contact being connected to said grid.

5. In an apparatus for electrically determining the level of molten glass in a tank of insulating material without the use of an outside source of energy and solely by the electrostatic charge accumulating on the surface of the glass, the invention comprising a charge collecting element located in the tank for relative movement between the element and the surface of the glass, solely electrostatic charge responsive means responsive to the collection of the charge by the element from the surface of the glass, and translating means actuated by said responsive means for determining the relative position of the contact to the surface of the glass.

JAMES A. VOORHIES.
J. EARL FRAZIER.

REFERENCES CITED

The following references are of record in the file of this patent:

UNITED STATES PATENTS

| Number | Name | Date |
|---|---|---|
| 761,381 | Hjorth | May 31, 1904 |
| 1,961,893 | Wadman et al. | June 5, 1934 |
| 2,032,016 | Hitner | Feb. 25, 1936 |
| 2,053,938 | Barker | Sept. 8, 1936 |
| 2,202,197 | Ewertz | May 28, 1940 |
| 2,380,436 | Holdman | July 31, 1945 |
| 2,423,888 | Hueser | July 15, 1947 |

FOREIGN PATENTS

| Number | Country | Date |
|---|---|---|
| 72,404 | Norway | Aug. 4, 1947 |
| 494,254 | France | May 26, 1919 |